(12) United States Patent
Gilbert

(10) Patent No.: US 12,122,266 B2
(45) Date of Patent: Oct. 22, 2024

(54) ADJUSTABLE PITCH SEAT TRACK FITTING

(71) Applicant: Safran Seats USA LLC, Gainesville, TX (US)

(72) Inventor: Klay Ethan Gilbert, Lindsay, TX (US)

(73) Assignee: SAFRAN SEATS USA LLC, Gainesville, TX (US)

( * ) Notice: Subject to any disclaimer, the term of this patent is extended or adjusted under 35 U.S.C. 154(b) by 260 days.

(21) Appl. No.: 17/866,771

(22) Filed: Jul. 18, 2022

(65) Prior Publication Data
US 2024/0017645 A1 Jan. 18, 2024

(51) Int. Cl.
*B60N 2/10* (2006.01)

(52) U.S. Cl.
CPC ........................... *B60N 2/10* (2013.01)

(58) Field of Classification Search
CPC .............................. B60N 2/10; B64D 11/0696
See application file for complete search history.

(56) References Cited

U.S. PATENT DOCUMENTS

| | | | | |
|---|---|---|---|---|
| 4,771,969 A * | 9/1988 | Dowd | ................ | B64D 11/0696 244/118.6 |
| 4,796,837 A * | 1/1989 | Dowd | ................ | B64D 11/0696 410/101 |
| 5,871,318 A | 2/1999 | Dixon et al. | | |
| 7,232,096 B1 * | 6/2007 | Ahad | ................ | B64D 11/0696 244/118.6 |
| 7,713,009 B2 * | 5/2010 | Hudson | .............. | B64D 11/0696 410/104 |
| 7,857,561 B2 * | 12/2010 | Mejuhas | ............ | B64D 11/0696 410/105 |
| 8,292,224 B1 * | 10/2012 | Ahad | ................. | B64D 11/0696 244/118.6 |
| 8,360,386 B2 * | 1/2013 | Marechal | ........... | B64D 11/0696 410/101 |
| 9,546,000 B2 * | 1/2017 | Shih | ................... | B64D 11/0696 |
| 10,913,536 B2 * | 2/2021 | Mochizuki | ......... | B64D 11/0696 |
| 11,352,145 B2 * | 6/2022 | Gross | ....................... | B64C 1/20 |

(Continued)

FOREIGN PATENT DOCUMENTS

EP 3421363 B1 10/2019

OTHER PUBLICATIONS

PCT/US2023/027428, International Search Report and Written Opinion, Oct. 9, 2023.

*Primary Examiner* — Mark R Wendell
(74) *Attorney, Agent, or Firm* — Kilpatrick Townsend & Stockton LLP

(57) ABSTRACT

Described are track fitting assemblies having bodies for attaching a leg of a passenger seat to a seat track. The body includes an underside, a first lateral side, a second lateral side, a first through-hole, and a second through-hole. The underside is configured to be connected with a stud that extends from the body. The first lateral side extends upward from the underside. The second lateral side is positioned opposite the first lateral side and extends upward from the underside. The first through-hole extends through the first lateral side and the second lateral side. The second through-hole extends through the first lateral side and the second lateral side. The second through-hole and the first through-hole are positioned for defining alternate attachment interfaces for attachment to the leg of the passenger seat.

19 Claims, 9 Drawing Sheets

(56) References Cited

U.S. PATENT DOCUMENTS

| | | | |
|---|---|---|---|
| 2002/0033622 A1* | 3/2002 | Jarnail | B60N 2/42709 297/216.2 |
| 2007/0063122 A1* | 3/2007 | Bowd | B64C 1/20 248/429 |
| 2009/0026827 A1* | 1/2009 | Bishop | B64D 11/0696 297/463.1 |
| 2011/0013972 A1 | 1/2011 | Roy et al. | |

\* cited by examiner

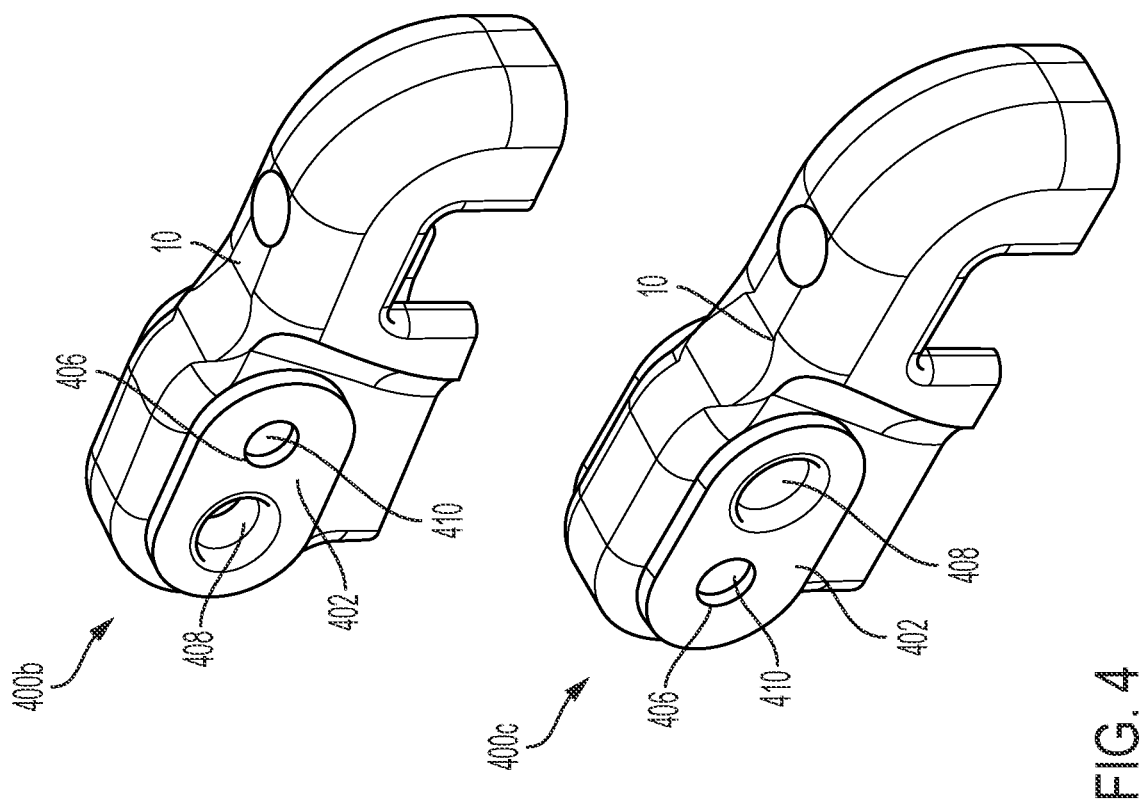
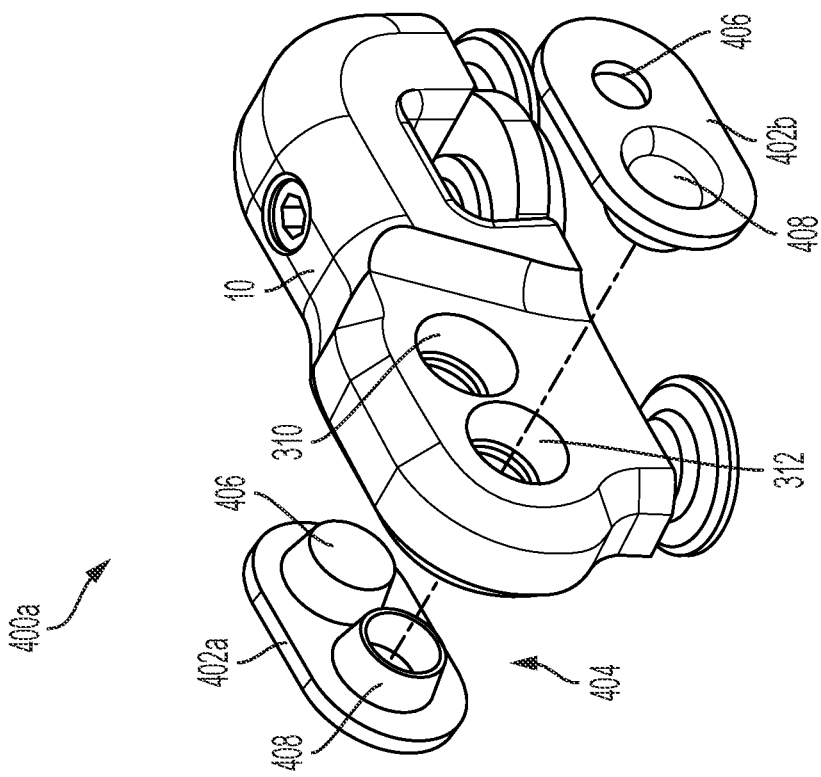
FIG. 4

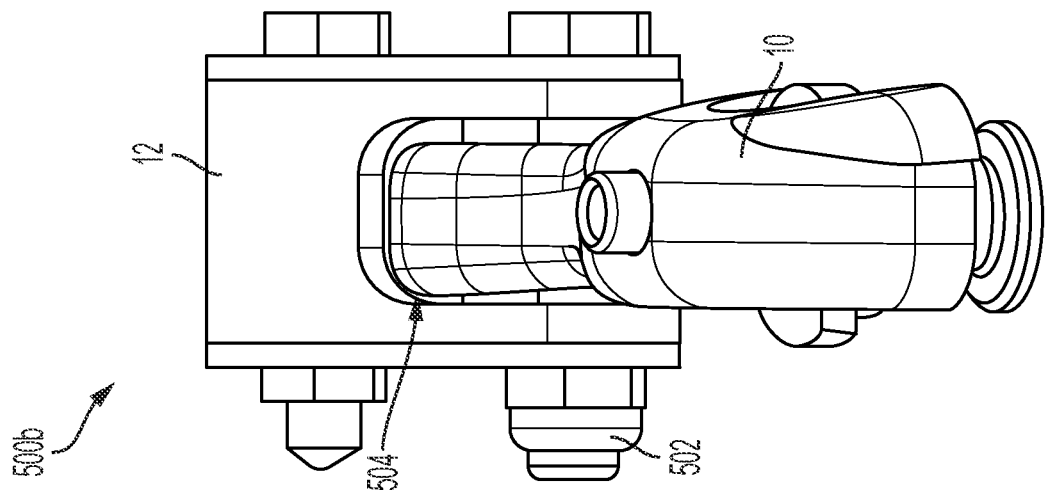
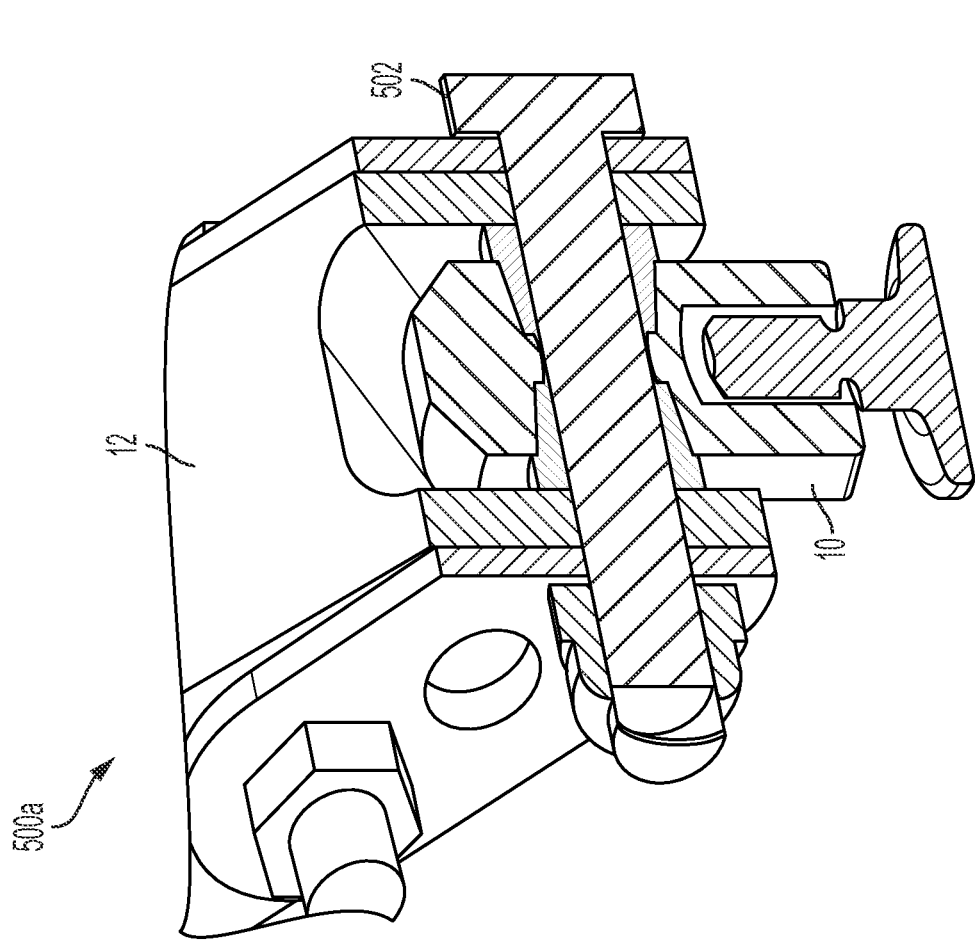
FIG. 5

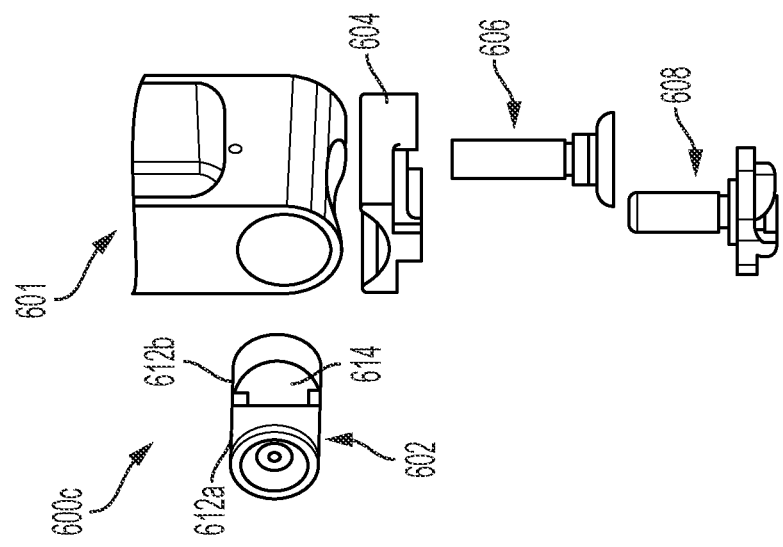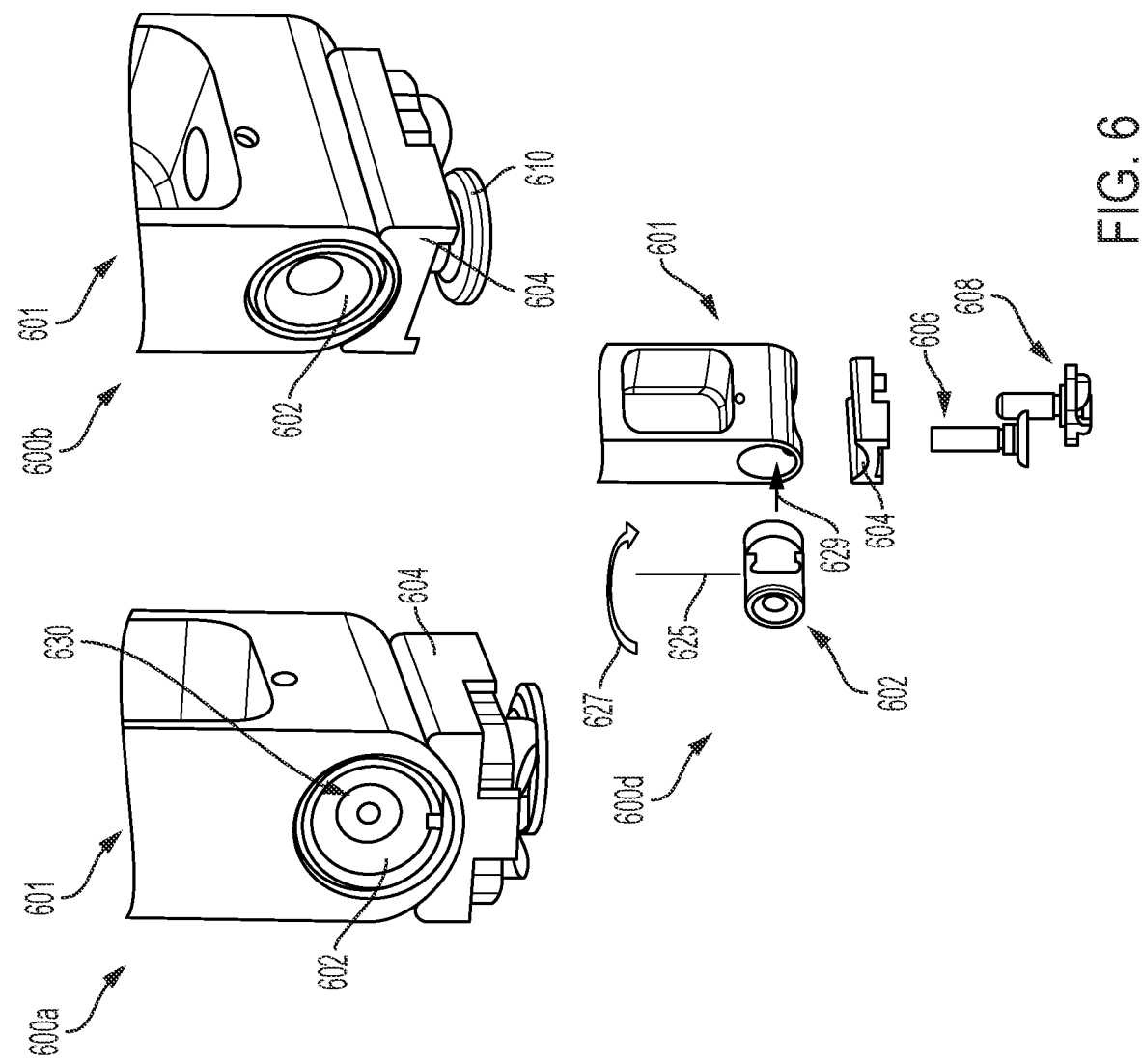
FIG. 6

ADJUSTABLE PITCH SEAT TRACK FITTING

FIELD OF THE INVENTION

The field of the invention relates to seat mounting assemblies for passenger vehicles.

BACKGROUND

Many vehicle seats such as those on passenger aircraft, buses, trains, and the like are removably mounted in a track secured to the floor of the vehicle. The tracks typically include a channel along their entire length, where two lips partially enclose the upper side of the channel to form a slot. Semicircular cutout portions are uniformly spaced along the lips to create a series of larger circular openings in the slot.

Typically, a track fitting assembly is used to couple the passenger seat to the track, where the track fitting assembly includes a front fitting and an aft fitting that each have studs that extend outwardly from the track fitting body. The studs are typically designed with a flared end attached to a narrower neck. The flared ends of the studs pass through the larger circular openings (e.g., in a vertical direction), and the track fitting assembly is moved along the track (e.g., in a horizontal direction) until the flared ends contact the underside of the slot lips. Standard threaded fasteners, bolts, or wedge-type elements are commonly used to create a snug fit between the studs and the track lips to prevent seat rattle and unintended seat displacement.

Passenger seats are separated along the track by a pitch, which is the distance between a common portion of respective passenger seats. For example, the pitch between two seats can be measured between a front end of the two seats or any other suitable component. The passenger seats can be configured along the track using various pitches. In some examples, changing the pitch is difficult. Switching between pitches is often a complex process, especially when switching between pitches that are standardized according to different increments. For example, installers may be tasked with replacing suitable components for one pitch (e.g., having a whole inch increment) with different components suitable for attaining a different pitch (e.g., an increment that ends with a half inch interval). In addition, replacing components on seats often involves certifying safety, function, or the like of the changed components and installing a placard for verifying the safety of each assembly that has had new different parts added. Replacing existing placards or covering existing placards is also typically prohibited by regulation. Thus, if changing parts are involved, excessive placards may be installed, which may result in insufficient space to place additional placards if many modifications are made during the useful life of the parts.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, track fitting assemblies include bodies for attaching a leg of a passenger seat to a seat track. The body includes an underside, a first lateral side, a second lateral side, a first through-hole, and a second through-hole. The underside is configured to be connected with a stud that extends from the body. The first lateral side extends upward from the underside. The second lateral side is positioned opposite the first lateral side and extends upward from the underside. The first through-hole extends through the first lateral side and the second lateral side. The second through-hole extends through the first lateral side and the second lateral side. The second through-hole and the first through-hole are positioned for defining alternate attachment interfaces for attachment to the leg of the passenger seat.

In some embodiments, a tensioner pin extends from the underside of the body to push down against the seat track such that an upward-facing surface of the stud is raised into engagement with a downward-facing surface of an overhanging lip of the seat track. In certain embodiments, the track fitting assembly includes a cap. The cap includes a base having a cover portion and a passage portion. The base can be sized to be received in alignment with the first through-hole and the second through-hole so that one of the first through-hole or the second through-hole is accessible through the passage portion while the other of the first through-hole or the second through-hole is obstructed by the cover portion. In some embodiments, the cover portion includes a closed-ended projection extending from the base and shaped as a plug, or the passage portion includes an open-ended projection extending from the base and shaped as a bushing.

In certain embodiments, the cap includes an indicator that includes an indentation, a portion colored differently than at least part of the passage portion, or an indicia to indicate which of the first through-hole or the second through-hole is obstructed by the cover portion. In some embodiments, the first through-hole and the second through-hole each include a profile shaped to correspond to a matching taper, and at least part of the cover portion and at least part of the passage portion each are shaped to correspond to the matching taper. In certain embodiments, the track fitting assembly includes a rear track fitting and is configured to include at least two studs, or the track fitting assembly includes a front track fitting and is configured to include at least one stud.

According to certain embodiments of the present invention, a passenger seat assembly can be configured for attachment to a seat track and includes a passenger seat, a front track fitting, and a rear track fitting. The passenger seat is supported by a front leg and a rear leg. The front track fitting can be coupled to secure the front leg with the seat track. The rear track fitting can be coupled to secure the rear leg with the seat track and can include a first through-hole and a second through-hole. The first through-hole defines a first attachment interface for attachment with the rear leg. The second through-hole defines a second attachment interface for attachment with the rear leg in an alternative mode of operation.

In some embodiments, the front track fitting includes a stud and a clamping pin that is extendible to push down against the seat track such that an upward-facing surface of the stud is raised into engagement with a downward-facing surface of an overhanging lip of the seat track. In certain embodiments, the stud and the clamping pin are threaded oppositely to one another. In some embodiments, the front track fitting includes a cylindrical insert having a first threaded notch and a second threaded notch positioned on opposite sides of a diameter of the cylindrical insert. The first threaded notch and the second threaded notch are threaded such that one is arranged to receive a right-handed thread from beneath and the other is arranged to receive a left-handed thread from beneath.

In certain embodiments, the front track fitting is configured for two alternate modes of operation including a first mode of operation and a second mode of operation. The first mode of operation involves the cylindrical insert arranged with the first threaded notch receiving the clamping pin in a fore portion of the front track fitting and involves the second threaded notch receiving the stud in an aft portion of the front track fitting. The second mode of operation involves the cylindrical insert rotated from the first mode of operation by 180 degrees about a vertical axis perpendicular to a longitudinal axis the cylindrical insert. In the second mode of operation, the cylindrical insert is arranged with the first threaded notch receiving the stud in the fore portion of the front track fitting, and the second threaded notch is receiving the clamping pin in the aft portion of the front track fitting.

In some embodiments, the cylindrical insert at or adjacent an end face includes a mode indicator to indicate whether the cylindrical is arranged in the first mode or the second mode. In certain embodiments, the front track fitting includes a pair of through-holes respectively defining different attachment interfaces for attachment with the front leg. In some embodiments, the passenger seat assembly includes the seat track.

According to certain embodiments of the present invention, a method can be used to reconfigure a passenger seating arrangement. A passenger seat secured to a seat track by a front fitting and a rear fitting such that a reference point of the passenger seat is arranged at an initial position along a length of the seat track can be accessed. The front fitting can be reconfigured to facilitate securement in which the reference point of the passenger seat is in an offset position that differs from the initial position by approximately 0.5 inches along the length of the seat track. The rear fitting can be reconfigured to facilitate securement in which the reference point of the passenger seat is in the offset position. A rear leg of the passenger seat can be disengaged from a first through-hole in the rear fitting, and the rear leg with a second through-hole can be engaged in the rear fitting.

In some embodiments, a pitch between seats of the passenger seating arrangement can be changed from a whole inch increment to a half inch increment by repeating the accessing, the reconfiguring the front fitting, and the reconfiguring the rear fitting for every other seat along the length of the seat track. In certain embodiments, reconfiguring the front fitting can include removing a cylindrical insert having oppositely threaded notches on opposite sides of a diameter of the cylindrical insert and installing the cylindrical insert in a reversed orientation to switch which of the oppositely threaded notches is facing forward and which is facing aft.

In some embodiments, reconfiguring the front fitting can include (i) rotating a stud in a rotational direction to engage one of the threaded notches for raising a portion of the stud into engagement with a downward-facing surface of an overhanging lip of the seat track, and (ii) rotating a clamping pin in the same rotational direction as the stud to engage the clamping pin with the other of the threaded notches for pushing a portion of the clamping pin down against the seat track. In certain embodiments, reconfiguring the rear fitting includes (i) removing a cap so that a cover portion of the cap is removed from the first through-hole and so that a passage portion of the cap is removed from the second through-hole, and (ii) reinstalling the cap so that the cover portion of the cap is installed at the second through-hole and so that the passage portion of the cap is installed at the first through-hole.

BRIEF DESCRIPTION OF THE DRAWINGS

FIG. 4 is a set of perspective views of the track fitting assembly of FIG. 3.

FIG. 5 is a set of views of the track fitting assembly of FIG. 3.

FIG. 6 is a set of views of a cylindrical insert of a front track fitting according to certain embodiments of the present invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide track fitting assemblies for passenger seats. While the track fitting assemblies are discussed for use with aircraft seats, they are by no means so limited. Rather, embodiments of the track fitting assemblies may be used in passenger seats or other seats of any type or otherwise as desired.

Figure 1:
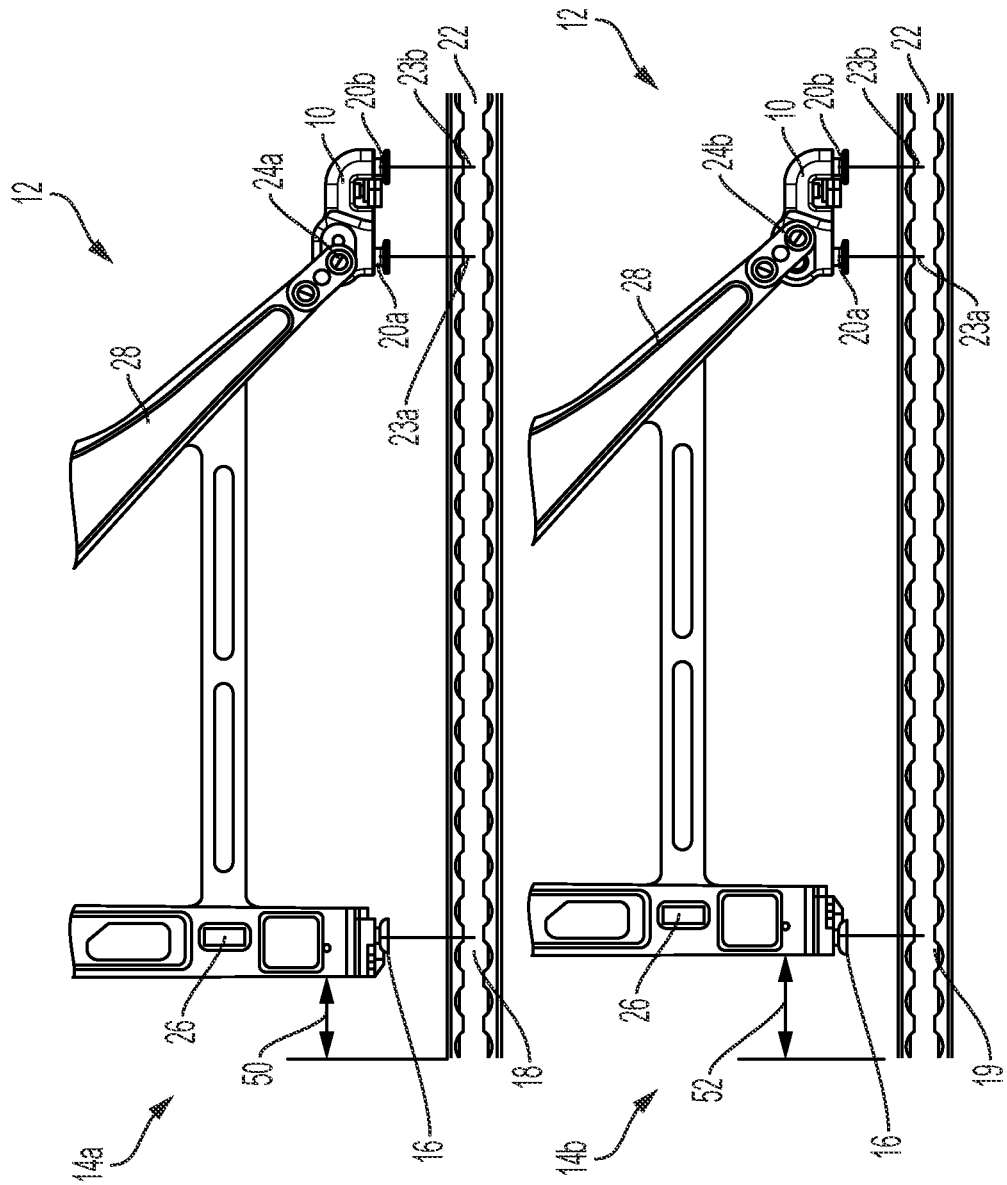
FIG. 1 is a set of side-views of a lower portion of a passenger seat with suitable track fitting assemblies for attaching a passenger seat to a track according to certain embodiments of the present invention.

FIG. 1 is a side-view of a track fitting assembly 10 attaching a passenger seat 12 to a track 22. In FIG. 1, the track 22 has been rotated 90 degrees from an installation orientation to more easily see relative alignment with features of the passenger seat 12.

As illustrated, the passenger seat 12 is attachable to the track 22 via the track fitting assembly 10 in two separate configurations 14a-b. In both configurations 14a-b, the passenger seat 12 is attachable to the track 22 by a forward stud 16 and two aft studs 20a-b. The forward stud 16 may affix a forward leg 26 of the passenger seat 12 to the track 22, and the aft studs 20*a-b* may affix an aft leg 28 of the passenger seat 12 to the track 22 via the track fitting assembly 10.

In the first configuration 14*a*, the passenger seat 12 is attached via a first connection point 24*a* of the track fitting assembly 10. In the second configuration 14*b*, the passenger seat 12 is attached via a second connection point 24*b* of the track fitting assembly 10. The first configuration 14*a* may involve the forward stud 16 positioned in a first track location 18 and the two aft studs 20*a-b* positioned in second track locations 23*a-b*. The second configuration 14*b* may involve the forward stud 16 positioned in a third track location 19 and the two aft studs 20*a-b* positioned in the second track locations 23*a-b*. For example, an operator or other suitable entity can adjust the passenger seat 12 into the first configuration 14*a* or the second configuration 14*b* by attaching the aft leg 28 to a first connection point 24*a* or a second connection point 24*b*, respectively, and by adjusting the forward stud 16 into an aft position or a fore position, respectively, for affixing the forward stud 16 to the track 22.

In some embodiments, switching between the first configuration 14*a* and the second configuration 14*b* can involve changing a relative position of the legs of the passenger seat 12 with respect to one or more of the studs (e.g., the forward stud 16). For example, the first configuration 14*a* may involve the forward stud 16 in an aft position to allow the forward stud 16 to be positioned in the track 22. Switching the passenger seat 12 to the second configuration 14*b* may cause the forward stud 16 to be positioned fore with respect to the forward leg 26 to allow the forward stud 16 to be positioned in the track 22. The different positions of the forward stud 16 in the first configuration 14*a* and the second configuration 14*b* can allow the passenger seat 12 to be positioned at different locations along the track 22. For example, the first configuration 14*a* may involve the passenger seat 12 being positioned a first distance 50 from a front of the track 22, and the second configuration 14*b* may involve the passenger seat 12 being positioned a second distance 52 from the front of the track 22. In some embodiments, the first distance 50 may differ from the second distance 52 by approximately 0.5 inches (1.27 cm). Thus, a pitch, or distance, between the passenger seat 12 and a different passenger seat can be adjusted between whole-inch increments and half-inch increments by merely changing a configuration of existing parts and without cutting, welding, or otherwise physically changing parts or swapping parts for other new parts, etc. In various examples, multiple configurations of a single set of parts can be certified on a single placard and thus avoid a proliferation of placards from changing configurations multiple times during the useful life of the assemblies.

The track fitting assembly 10 can be used to avoid a scenario in which parts are swapped or physically altered to reconfigure the passenger seat 12. For example, comparison may be made to a scenario that can involve adjusting a pitch for other passenger seat assemblies without the track fitting assembly 10. Such adjusting the pitch for the other passenger seat assemblies may involve changing parts. For example, to adjust the pitch of the other passenger seat assemblies by approximately 0.5 inches (1.27 cm), a different track fitting component may need to be machined and used to replace an existing track fitting component of the other passenger seat assemblies. Additionally, in some examples (e.g., involving aircraft parts, etc.), each change of parts or configuration of parts may involve re-certifying the other passenger seat assemblies and installing a new placard. Accordingly, switching the configuration or parts of the other passenger seat assemblies may cause excessive amounts of placards to be placed on the other passenger seat assemblies, and further switching of the configuration or parts may not be possible if an updated or otherwise new placard cannot be properly placed on the passenger seat.

The track fitting assembly 10 can address the above problems. For example, adjusting the pitch of the passenger seat 12 and the different passenger seat may involve not switching parts of the passenger seat 12, or the like. In one such example, switching a configuration of the passenger seat 12 from the first configuration 14*a* to the second configuration 14*b* may involve disengaging the aft leg 28 from the first connection point 24*a* of the track fitting assembly 10 and engaging the aft leg 28 with the second connection point 24*b*. Thus, no additional placards may be required to be placed on the passenger seat 12 in response to adjusting the pitch using the track fitting assembly 10. Additionally, the track fitting assembly 10 may (i) reduce a time of adjusting the pitch of the passenger seat 12 and the different passenger seat, (ii) reduce an amount of overall parts needed for assembling the passenger seat 12, and/or (iii) reduce an amount of errors in assembling the passenger seat 12 due to the reduction of parts and an ease of use of the track fitting assembly 10.

Figure 2:
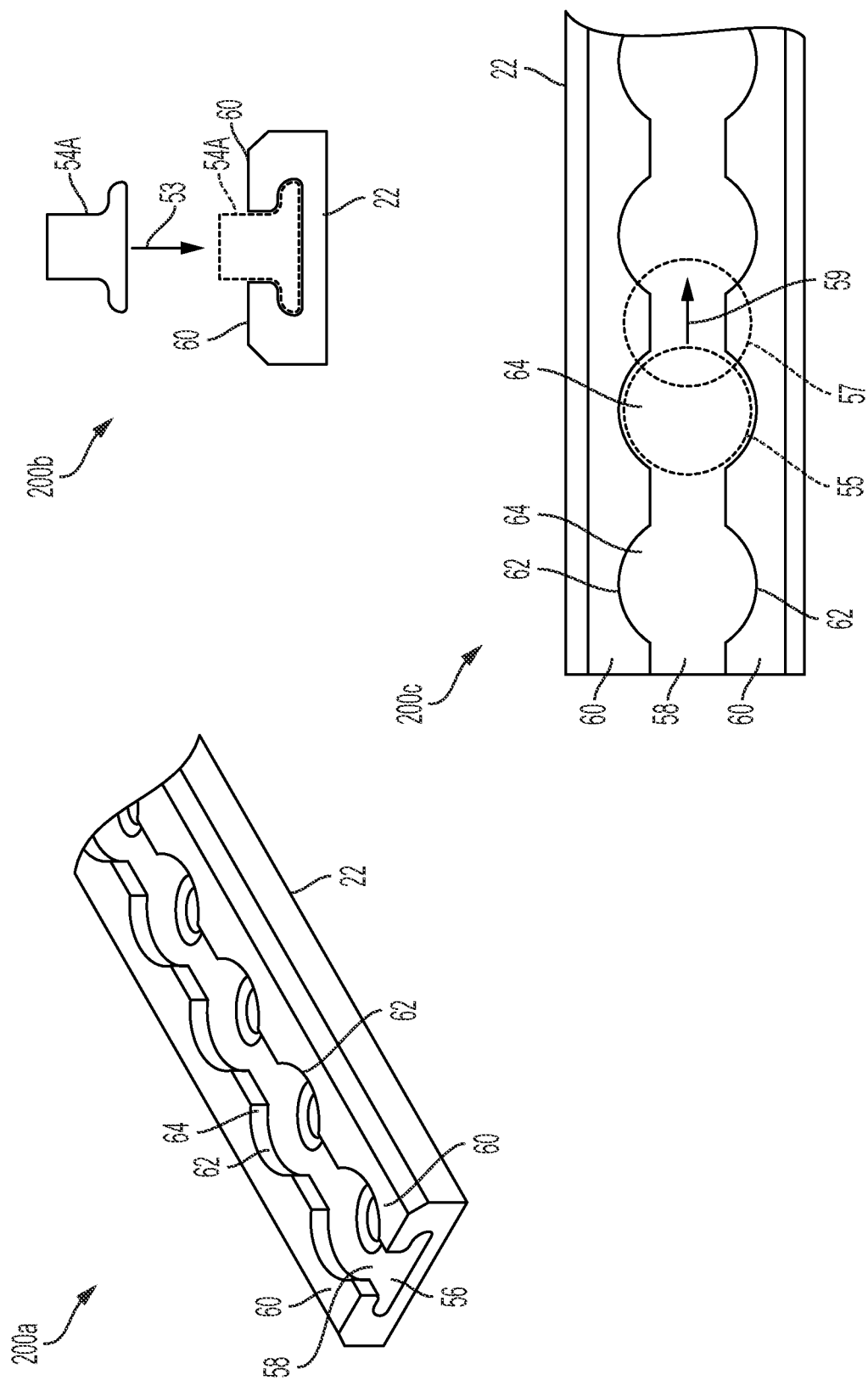
FIG. 2 is a set of views of a track according to some embodiments of the present invention.

FIG. 2 is a set of views of a track 22. As illustrated, FIG. 2 includes a perspective view 200*a*, an end view 200*b*, and a top view 200*c*. As illustrated in the perspective view 200*a*, the track 22 includes a channel 56, a slot 58, a pair of lips 60, cutout portions 62, and openings 64. The shape and arrangement of features of the track 22 may be determined based on functional and/or aesthetic concerns. As illustrated in FIG. 2, the channel 56 extends along the length of the track 22. The pair of lips 60 can partially enclose an upper side of the channel 56 to form the slot 58. The cutout portions 62 are positioned along the length of the pair of lips 60 to create otherwise define the openings 64. For example, the openings 64 may be formed in the slot 58.

The openings 64 may provide access into the channel 56. The cutout portions 62, the openings 64, or other suitable components may be rounded. For example, the cutout portions 62 and the openings 64 may be respectively semi-circular and circular or other shapes. The cutout portions 62 and openings 64 may be repeated at regular spacing along the length of the slot 58 of the track 22. In one such example, the cutout portions 62 and the openings 64 are spaced approximately 1 inch (2.54 cm) apart, for example, center to center. The openings 64 may be approximately 0.780 inches (1.981 cm) in diameter or other suitable size. In one example, the size may correspond to an appropriate size for permitting insertion of studs 54A (e.g., the forward stud 16, the aft studs 20*a-b*, etc.), shear pins, or other features of the track fitting assembly 10 into the track 22. However, other sizes may additionally or alternatively be used.

In some embodiments, a stud 54A of the track fitting assembly 10 may be inserted through an opening 64 in the track 22. For example, and with respect to the end view 200*b*, this may correspond to a movement of the stud 54A from the position shown in solid lines to the position shown in phantom lines, as illustrated by the arrow 53. With reference to the top view 200*c*, such insertion may position the stud 54A within a perimeter of the opening 64, such as at the first position shown by the outline 55. From the inserted position shown by the outline 55, the stud 54A can be translated (e.g., as illustrated by arrow 59) a suitable distance to be brought into engagement with the portions of the lips 60 that are in between the cutout portions 62 (e.g., to the second position shown by the outline 57). Such translation may be achieved by moving the track fitting assembly 10 forward or backward along the length of the track 22. In some embodiments, the track fitting assembly 10 may be further secured in place by deploying suitable features (e.g., shear pins) for preventing additional forward or backward translation of the track fitting assembly 10 relative to the track 22.

Figure 3:
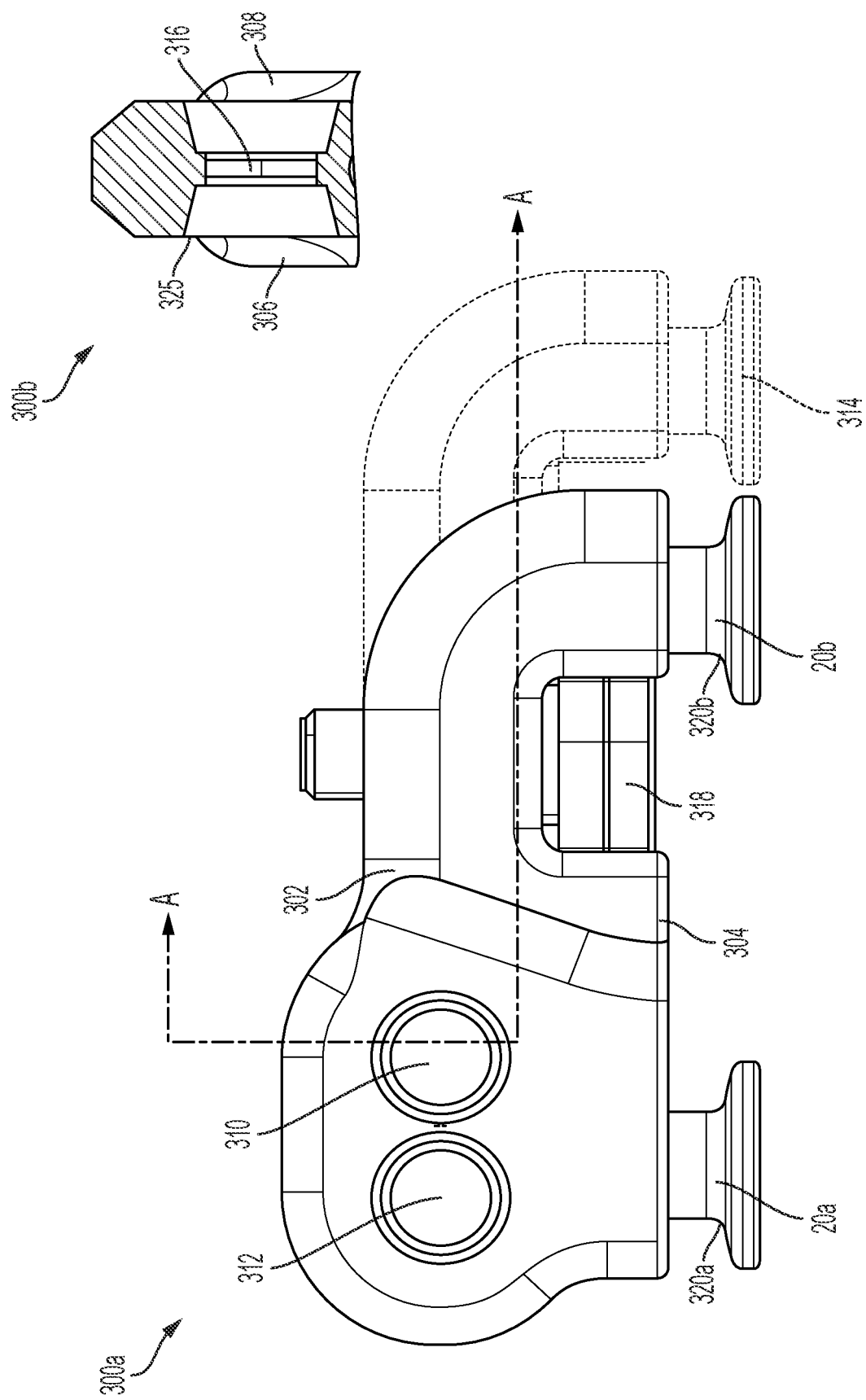
FIG. 3 is set of views including a side view and a partial sectional end view of a track fitting assembly according to certain embodiments of the present invention.

According to certain embodiments, e.g., as shown in FIGS. 3-5, a track fitting assembly 10 comprises a body 302. FIG. 3 is a side-view of the track fitting assembly 10. As illustrated, FIG. 3 includes a side-view 300a and an end view 300b. The end view 300b may correspond to a partial section view taken along line A-A, for example. As may be best seen in the side-view 300a, the body 302 of the track fitting assembly 10 can include an underside 304, a first through-hole 310, and a second through-hole 312. Additionally, and as may be best seen in the end view 300b, the body 302 of the track fitting assembly 10 can include a first lateral side 306 and a second lateral side 308. The track fitting assembly 10, and/or the body 302 thereof, can include any other suitable part or component for affixing the passenger seat 12 to the track 22. The track fitting assembly 10 may be formed of materials including but not limited to aluminum, stainless steel, aramid fibers, polycarbonate, polypropylene, other metallic materials, composite materials, or other similar materials The underside 304 can be configured to be connected with a stud. For example, the track fitting assembly 10 can include the aft studs 20a-b, which can extend downward from the track fitting assembly 10 and can be received in the track 22. In some examples, the track fitting assembly 10 can include an additional stud 314 that can also extend downward from the track fitting assembly 10 and can be received in the track 22. As illustrated in FIG. 3, the track fitting assembly 10 is a rear track fitting assembly and may include two, three, or other suitable numbers of studs (e.g., aft studs 20a-b, the additional stud 314, etc.) for affixing the aft leg 28 of the passenger seat 12 to the track 22. In other examples, the track fitting assembly 10 can be or otherwise include a front track fitting assembly including one or more studs for affixing the forward leg 26 of the passenger seat 12 to the track 22.

The first lateral side 306 and the second lateral side 308 can extend upward from the underside 304. For example, the underside 304 may be at a first position, and the first lateral side 306, the second lateral side 308, or a combination thereof may extend from the first position to a second position, which may be at a location above or otherwise upwards from the first position. Additionally, the second lateral side 308 may be positioned opposite the first lateral side 306 with respect to a center 316 (e.g., illustrated in the end view 300b) of the track fitting assembly 10.

As illustrated, the first through-hole 310 and the second through-hole 312 extend through the track fitting assembly 10. For example, the first through-hole 310 and the second through-hole 312 can extend from the first lateral side 306 to the second lateral side 308. The first through-hole 310 and the second through-hole 312 are illustrated as having the same or similar diameter, but the first through-hole 310 and the second through-hole 312 can include any other suitable diameters including differing diameters. Additionally or alternatively, the first through-hole 310 and the second through-hole 312 can each include a profile shaped to correspond to a matching taper. In some embodiments, the track fitting assembly 10 can include a taper 325 that can allow some deflection along one or more suitable axes (e.g., the roll axis).

The first through-hole 310 and the second through-hole 312 can be configured or otherwise arranged to receive an attachment device for attaching the passenger seat 12 to the track fitting assembly 10. For example, the first through-hole 310 and the second through-hole 312 can be positioned relative to one another to define alternate attachment interfaces for attaching the passenger seat 12 to the track fitting assembly 10. In one such example, the first through-hole 310 can be arranged to receive the passenger seat 12 having a first pitch with respect to the different passenger seat, and the second through-hole 312 can be arranged to receive the passenger seat 12 having a second pitch with respect to the different passenger seat such that the second pitch differs from the first pitch by approximately 0.5 inches (1.27 cm). Other suitable arrangements of the first through-hole 310 and the second through-hole 312 are possible.

In some embodiments, the track fitting assembly 10 additionally includes a tensioner pin 318. The tensioner pin 318 can extend downward from the underside 304 of the body 302 of the track fitting assembly 10. The tensioner pin 318 can push downward against the track 22, for example when the track fitting assembly 10 is installed on the track 22, such that an upward-facing surfaces 320a-b of the aft studs 20a-b or other suitable studs are raised into engagement with a downward-facing surface of a suitable component of the track 22. In some examples, the suitable component of the track 22 includes an overhanging lip, for example, of the pair of lips 60. Additionally, raising the upward-facing surfaces 320a-b into engagement with the downward-facing surface of the suitable component of the track 22 can involve causing the upward-facing surfaces 320a-b to exert a stabilizing force against the downward-facing surface of the suitable component of the track 22.

FIG. 4 is a set of perspective views of the track fitting assembly 10 of FIG. 3. As illustrated, FIG. 4 includes a first perspective view 400a, a second perspective view 400b, and a third perspective view 400c. The first perspective view 400a illustrates the track fitting assembly 10 and a cap 402. The cap 402 can include a base 404 that includes a cover portion 406, a passage portion 408, and any other suitable portions or components. In some examples, the cap 402 can include two components. For example, a first component 402a can be positioned on the first lateral side 306, and a second component 402b can be positioned on the second lateral side 308. The first component 402a and the second component 402b may be mirror images of each other and/or may include suitable features for facilitating mating engagement with each other, the first through-hole 310, the second through-hole 312, and/or other features of the track fitting assembly 10.

The base 404 can be sized to be received in alignment with the first through-hole 310 and the second through-hole 312. Accordingly, one of the first through-hole 310 or the second through-hole 312 can be accessed through the passage portion 408 of the cap 402, and the other of the first through-hole 310 or the second through-hole 312 can be obstructed or blocked from access by the cover portion 406. In some examples, the cover portion 406 can include a closed-ended projection that can extend from the body 302 and can be shaped as a plug or otherwise suitably shaped. In some examples, the passage portion 408 can include an open-ended projection extending from the body 302 and shaped as a bushing or otherwise suitably shaped. Structure of the cap 402 may extend into the first through-hole 310 and/or the second through hole 312 when the cap 402 is seated, for example. In some embodiments, at least part of the cover portion 406 and at least part of the passage portion 408 each are shaped to correspond to the matching taper of the first through-hole 310 and the second through-hole 312.

The second perspective view 400*b* illustrates a first configuration of the cap 402 installed in the track fitting assembly 10, and the third perspective view 400*c* illustrates a second configuration of the cap 402 installed in the track fitting assembly 10. The first configuration involves the cover portion 406 positioned in the first through-hole 310 and the passage portion 408 positioned in the second through-hole 312, and the second configuration involves the passage portion 408 positioned in the first through-hole 310 and the cover portion 406 positioned in the second through-hole 312.

In some embodiments, the cap 402 includes an indicator 410 that indicates which of the first through-hole 310 or the second through-hole 312 is obstructed by the cover portion 406. For example, and as illustrated in FIG. 4, the indicator 410 is positioned in front of the first through-hole 310 in the first configuration and in front of the second through-hole 312 in the second configuration. The indicator 410 can include an indentation, a differently colored portion than a portion of the passage portion 408, an indicia, or other suitable indicators for indicating which of the first through-hole 310 or the second through-hole 312 is obstructed by the cover portion 406.

FIG. 5 is a set of views of the track fitting assembly 10 of FIG. 3. As illustrated, FIG. 5 includes a sectional view 500*a* and an end view 500*b*. The sectional view 500*a* illustrates an attachment device 502, such as suitable fasteners, which may include but are not limited to screws, bolts, nuts, washers, rivets or other mechanical or chemical fasteners, that can be used to attach the passenger seat 12 to the track fitting assembly 10. The end view 500*b* illustrates the passenger seat 12 attached to the track fitting assembly 10. As illustrated in Figure the track fitting assembly 10 is an aft track fitting, but the track fitting assembly 10 can be or otherwise include any other suitable track fitting assemblies such as a forward track fitting.

The attachment device 502 can be positioned through the track fitting assembly for attaching the passenger seat 12 to the track fitting assembly 10. For example, in a first configuration, the attachment device 502 can be positioned in the passage portion 408 of the cap 402 positioned in the first through-hole 310. In other examples, in a second configuration, the attachment device 502 can be positioned in the passage portion 408 of the cap 402 positioned in the second through-hole 312. In some embodiments, the passenger seat 12 can be attached to the track fitting assembly 10 via the attachment device 502 such that a buffer region 504 is maintained between the passenger seat 12 and the track fitting assembly 10. In some embodiments, the buffer region 504 can include various angles, such as approximately ten degrees. Additionally, the buffer region 504 may correspond to the taper 325. For example, the track fitting assembly 10 may be arranged such that the buffer region 504 is positioned opposite the taper 325 for allowing variations or fluctuations along one or more suitable axes (e.g., the roll axis) of the passenger seat 12.

FIG. 6 is a set of views of a cylindrical insert 602 of a front track fitting 601. As illustrated, FIG. 6 includes a first perspective view 600*a*, a second perspective view 600*b*, a first exploded view 600*c*, and a second exploded view 600*d*. The first perspective view 600*a* illustrates the cylindrical insert 602 positioned in the front track fitting 601 for connecting the passenger seat 12 to the front track fitting 601. The first exploded view 600*c* illustrates the components of the front track fitting 601. For example, the front track fitting 601 can include or otherwise receive a stud 606, a tensioner pin 608, and any other suitable component for attaching the passenger seat 12 to the track 22. The tensioner pin 608 can be extended to push down against the track 22 such that an upward-facing surface 610 of the stud 606 is raised into engagement with a downward-facing surface of an overhanging lip (e.g., lips 60) of the track 22.

In some embodiments, the cylindrical insert 602 can include a first threaded notch 612*a* and a second threaded notch 612*b*. For example, one may include a right-handed thread or threaded surface and the other may include a left-handed thread or threaded surface. The first threaded notch 612*a* and the second threaded notch 612*b* can be positioned on opposite sides with respect to a center 614 of the cylindrical insert 602. The tensioner pin 608 and the stud 606 can be oppositely threaded in the front track fitting 601. For example, one may include a right-handed thread or threaded surface and the other may include a left-handed thread or threaded surface. In some embodiments, the first threaded notch 612*a* can be threaded to receive a clockwise or right-handed thread from beneath and the second threaded notch 612*b* can be threaded to receive a counter-clockwise or left-handed thread from beneath or vice versa. For example, the stud 606 can be threaded clockwise or in a right-handed manner into the front track fitting 601, and the tensioner pin 608 can be threaded counter-clockwise or in a left-handed manner into the front track fitting 601. In another example, the stud 606 can be threaded counter-clockwise or in a left-handed manner into the front track fitting 601, and the tensioner pin 608 can be threaded clockwise or in a right-handed manner into the front track fitting 601.

The front track fitting 601 can be configured for two alternate modes of operation. For example, the exploded view 600*c* illustrates a first mode of operation of the front track fitting 601, and the exploded view 600*d* illustrates a second mode of operation of the front track fitting 601. The first mode of operation can involve the cylindrical insert 602 arranged with the first threaded notch 612*a* receiving the tensioner pin 608 in a forward portion of the front track fitting 601. Additionally, the first mode of operation can involve the cylindrical insert 602 arranged with the second threaded notch 612*b* receiving the stud 606 in an aft portion of the front track fitting 601. The second mode of operation can involve the cylindrical insert 602 rotated from a configuration of the cylindrical insert 602 of the first mode of operation by approximately 180 degrees about a vertical axis 625 perpendicular to a longitudinal axis of the cylindrical insert 602. To switch between the first mode and the second mode of operation, the cylindrical insert 602 may be rotated about the vertical axis 625 (e.g., as illustrated by arrow 627) and re-inserted into the front track fitting 601 (e.g., as illustrated by arrow 629). The second mode of operation can involve the cylindrical insert 602 arranged with the first threaded notch 612*a* receiving the stud 606 in the forward portion of the front track fitting 601. Additionally, the second mode of operation can involve the cylindrical insert 602 arranged with the second threaded notch 612*b* receiving the tensioner pin 608 in the aft portion of the front track fitting 601.

The cylindrical insert 602 can include an indicator 630 that can indicate whether the cylindrical insert is arranged in the first mode of operation or in the second mode of operations. For example, the indicator 630 can be positioned at an end face of the cylindrical insert 602, adjacent to the end face of the cylindrical insert 602, or in other suitable locations. As illustrated in the first perspective view 600*a*, the indicator 630 is positioned in a center portion of the end face of the cylindrical insert 602 indicating that the cylindrical insert is arranged in the first mode of operation. The second perspective view 600b illustrates the cylindrical insert 602 in the second mode of operation such that the indicator 630 is not visible in the second perspective view 600b. Other configurations of the indicator 630 are possible.

The front track fitting 601 may further include a base 604. The base 604 may be included in addition to or in lieu of the cylindrical insert 602. The base 604 may include similar and/or complimentary features relative to features of the cylindrical insert 602. For example, the base 604 may include suitable apertures or other features for respectively aligning and/or receiving the stud 606 and the tensioner pin 608. Respective apertures through the base 604 may include threaded surfaces configured to match and/or receive structure of the stud 606 and the tensioner pin 608, for example. In some examples, the stud 606 and the tensioner pin 608 may extend through the base 604 and into the cylindrical insert 602 in use. The base 604 may be reconfigurable (e.g., reversible) to facilitate re-location and/or re-positioning of the stud 606 and the tensioner pin 608. For example, the base may be rotatable (e.g., as illustrated by arrow 627) to facilitate switching which of the tensioner pin 608 and the stud 606 is fore and aft. The base 604 is also shown with different patterns of projections (e.g., a central downward projection on one side as in the views 600a and 600c, and a pair of downward projections at opposite corners as in the views 600b and 600d) although any other form of suitable structure may be included to perform a similar function to the indicator 630.

Figure 7:
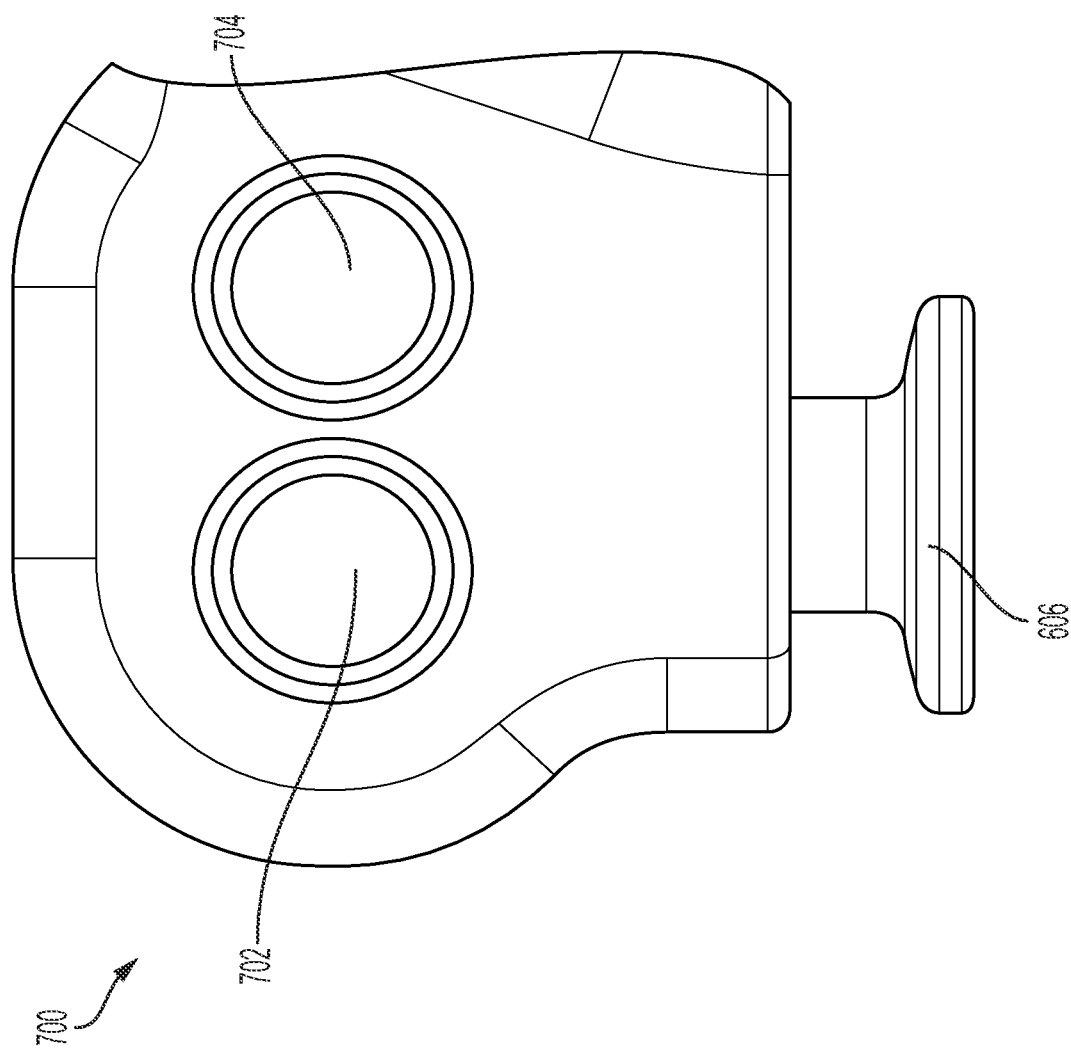
FIG. 7 is a side-view of a front track fitting according to certain embodiments of the present invention.

FIG. 7 is a side-view of a front track fitting 700. In some embodiments, the front track fitting 700 can be used additionally or alternatively to the front track fitting 601 illustrated with respect to FIG. 6. As illustrated, the front track fitting 700 includes a first through-hole 702, a second through-hole 704, and the stud 606. The stud 606 can be used to attach the front track fitting 700 to the track 22. An attachment device (e.g., the attachment device 502) can be positioned in the first through-hole 702 or the second through-hole 704 for attaching the passenger seat 12 to the front track fitting 700.

The first through-hole 702 and the second through-hole 704 can be positioned with respect to the front track fitting 700 to define different attachment interfaces or configurations for attaching the passenger seat 12 to the front track fitting 700. For example, the attachment device 502 can be positioned in the first through-hole 702 to achieve a first pitch between the passenger seat 12 and the different passenger seat, and the attachment device 502 can be positioned in the second through-hole 704 to achieve a second pitch between the passenger seat 12 and the different passenger seat. In some embodiments, the first pitch and the second pitch may be different by approximately 0.5 inches (1.27 cm).

Figure 8:
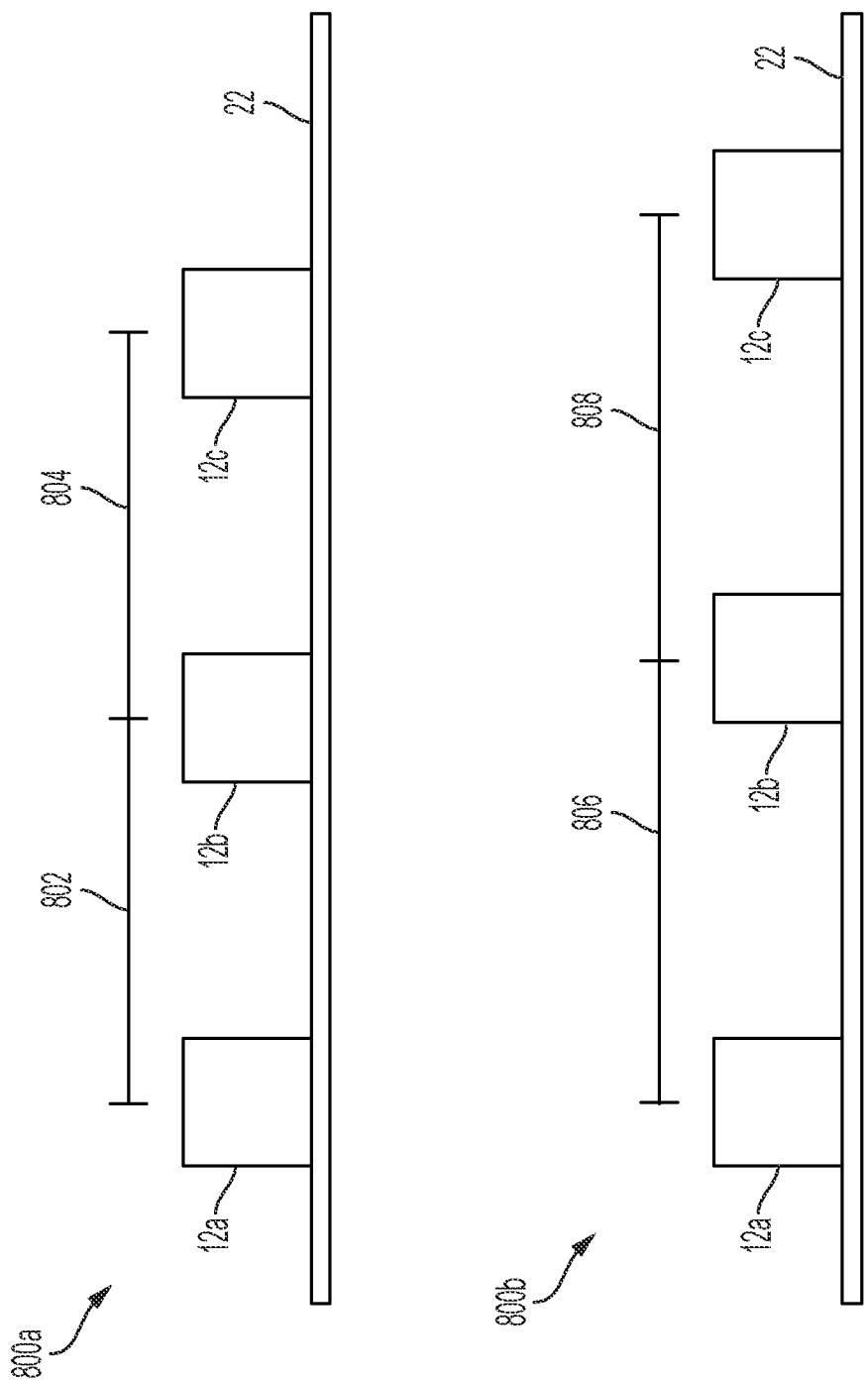
FIG. 8 is a set of side views of a set of passenger seats with varying pitch according to certain embodiments of the present invention.

FIG. 8 is a set of side views of a set of passenger seats 12a-c with varying pitch. The side view 800a illustrates the passenger seats 12a-c in a first or initial configuration, and the side view 800b illustrates the passenger seats 12a-c in a second or updated configuration. In some embodiments, the initial configuration involves the passenger seats 12a-c spaced apart in whole-inch increments, and the updated configuration involves the passenger seats 12a-c spaced apart in half-inch increments. Other suitable configurations of pitches between the passenger seats 12a-c are possible.

The initial configuration can include a first pitch between the passenger seats 12a-c. For example, the first pitch can be 31 inches (78.74 cm), which involves each passenger seat being spaced apart by 31 inches (78.74 cm). As illustrated, the passenger seat 12a is spaced apart from the passenger seat 12b by a first distance 802 measured from a center of the passenger seat 12a to a center of the passenger seat 12b, and the passenger seat 12b is spaced apart from the passenger seat 12c by a second distance 804 measured from the center of the passenger seat 12b to a center of the passenger seat 12c. In some embodiments, the first distance 802 may be similar or identical to the second distance 804. For example, the first distance 802 and the second distance 804 may be 31 inches (78.74 cm) or other suitable whole-inch increments.

The updated configuration can include a second pitch between the passenger seats 12a-c. For example, the second pitch can be 31.5 inches (80.01 cm), which involves each passenger seat being spaced apart by 31.5 inches (80.01 cm). As illustrated, the passenger seat 12a is spaced apart from the passenger seat 12b by a third distance 806 measured from a center of the passenger seat 12a to a center of the passenger seat 12b, and the passenger seat 12b is spaced apart from the passenger seat 12c by a fourth distance 808 measured from the center of the passenger seat 12b to a center of the passenger seat 12c. In some embodiments, the third distance 806 may be similar or identical to the fourth distance 808. For example, the third distance 806 and the fourth distance 808 may be 31.5 inches (80.01 cm) or other suitable half-inch increments.

In some embodiments, the pitch between the passenger seats 12a-c can be adjusted from the initial configuration to the updated configuration. For example, the rear track fitting of every other seat can be reconfigured. Reconfiguring the rear track fitting can involve disengaging an attachment device from a first through-hole of the rear track fitting and reengaging the attachment device with a second through-hole of the rear track fitting in which the first through-hole is offset from the second through-hole by approximately 0.5 inches (1.27 cm). In one such example, the rear track fittings of the passenger seat 12a and the passenger seat 12c can be reconfigured, while the passenger seat 12b can simply be translated without reconfiguring the rear track fitting of the passenger seat 12b.

Figure 9:
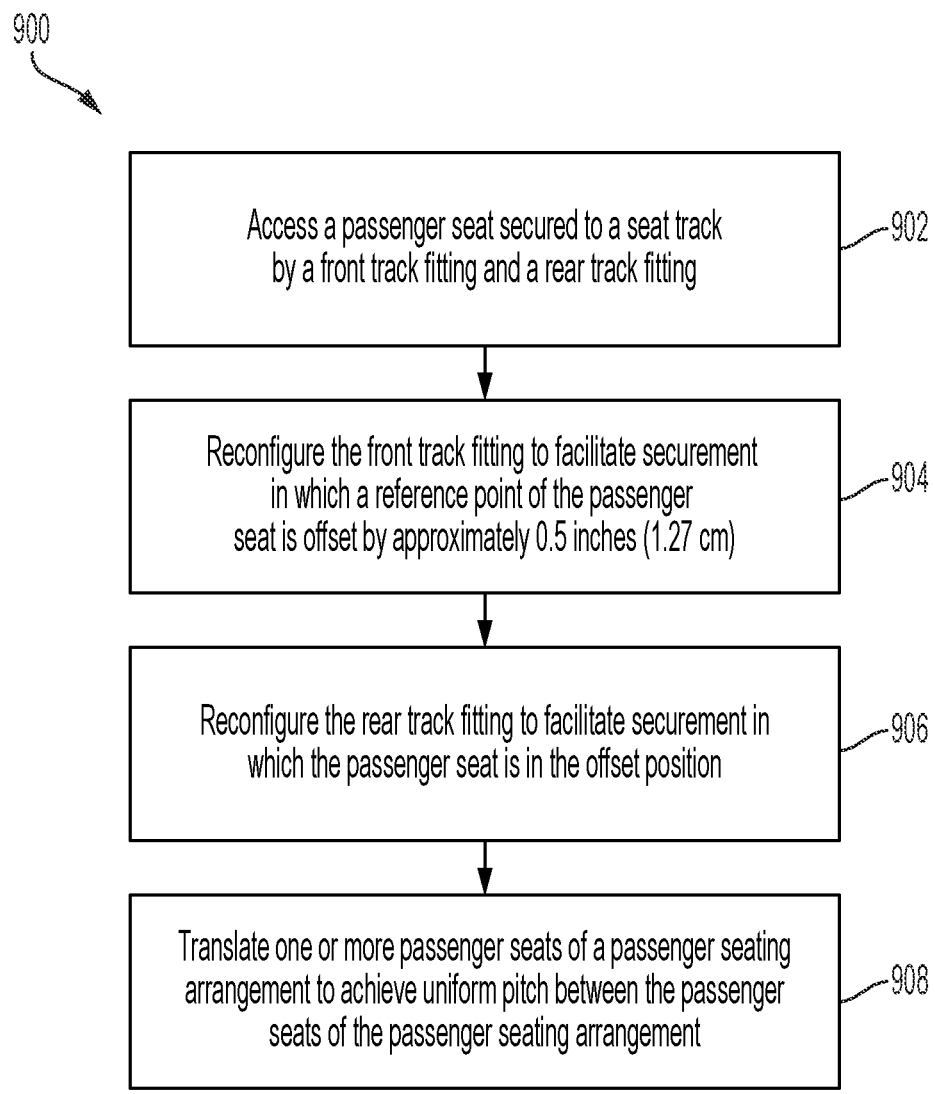
FIG. 9 is a flowchart of a process for reconfiguring a passenger seating arrangement using a track fitting assembly according to certain embodiments of the present invention.

FIG. 9 is a flowchart of a process 900 for reconfiguring a passenger seating arrangement using a track fitting assembly 10. At block 902, a passenger seat 12 is accessed. The passenger seat 12 can be secured to a track 22 via a front track fitting (e.g., the front track fitting 700) and via a rear track fitting (e.g., the track fitting assembly 10). The passenger seat 12 can be arranged such that the passenger seat 12 is at an initial position along a length of the track 22. In some embodiments, the track 22 includes upward-facing openings spaced apart by approximately 1 inch (2.54 cm). Additionally, the initial position may involve the passenger seat 12 having an initial pitch with respect to a different passenger seat.

At block 904, the front track fitting is reconfigured to facilitate securement in which the reference point of the passenger seat 12 is offset by approximately 0.5 inches (1.27 cm). For example, the front track fitting can be reconfigured to adjust the reference point of the passenger seat 12 from the initial position to an updated position that is offset from the initial position by approximately 0.5 inches (1.27 cm). The offset distance can be other suitable distances, for example less than 0.5 inches (1.27 cm), greater than 0.5 inches (1.27 cm), etc. In some embodiments, the front track fitting can include or otherwise be the front track fitting 700 illustrated and described with respect to FIG. 7. Accordingly, the front track fitting 700 at the block 904 can be reconfigured by switching an attachment device from the first through-hole 702 to the second through-hole 704 or from the second through-hole 704 to the first through-hole 702. Switching the attachment device between the first through-hole 702 and the second through-hole 704 can allow the reference point to be adjusted by approximately 0.5 inches (1.27 cm).

In some embodiments, reconfiguring the front track fitting involves reconfiguring the cylindrical insert 602 illustrated and described with respect to FIG. 6. For example, the cylindrical insert 602, which includes oppositely threaded notches on opposite sides of a diameter of the cylindrical insert 602, can be removed from the front track fitting. Additionally, the cylindrical insert 602 can be installed in a reversed orientation. For example, the cylindrical insert 602 can be rotated about the diameter of the cylindrical insert 602 such that positions of the oppositely threaded notches are reversed with respect to the diameter of the cylindrical insert 602. Upon rotating the cylindrical insert 602, the cylindrical insert 602 can be inserted or otherwise reinstalled in the front track fitting to secure the passenger seat 12 to the front track fitting. Reconfiguring the cylindrical insert 602 may facilitate switching the position of a stud (e.g., the stud 606) and a tensioner pin 608. For example, reconfiguring the cylindrical insert 602 may facilitate switching between an arrangement in which the tensioner pin 608 is located fore and the stud 606 is located aft (as in 600*d*) and another arrangement in which the tensioner pin 608 is located aft and the stud 606 is located fore (as in 600*c*).

In some embodiments, reconfiguring the front track fitting involves a stud (e.g., the stud 606) and a tensioner pin 608. For example, the stud 606 can be rotated in a rotational direction to engage one of the threaded notches of the cylindrical insert 602 for raising a portion of the stud 606 into engagement with a downward-facing surface of an overhanging lip of the seat track. Additionally, the tensioner pin 608 can be threaded and rotated into the other threaded notch of the cylindrical insert 602 such that rotating the tensioner pin 608 in the same direction as the stud 606 adjusts the tensioner pin 608 in an opposite direction with respect adjusting the stud 606. The tensioner pin 608 can be rotated in the same direction as the stud 606 to engage the tensioner pin 608 with the other threaded notch of the cylindrical insert 602 for pushing a portion of the tensioner pin down against the track 22. For example, in some arrangements, the tensioner pin 608 and the stud 606 can both be rotated in a counterclockwise direction for securing to the track 22, or in other arrangements, the tensioner pin and the stud 606 can both be rotated in a clockwise direction for securing to the track 22.

At block 906, the rear track fitting is reconfigured to facilitate securement of the passenger seat 12 in the updated position. For example, the rear track fitting can be reconfigured to adjust the reference point of the passenger seat 12 from the initial position to the updated position, which may be offset from the initial position by approximately 0.5 inches (1.27 cm) or other suitable distances. In some embodiments, reconfiguring the rear track fitting involves disengaging the aft leg 28 of the passenger seat 12 from a first through-hole of the rear track fitting and engaging the aft leg 28 with a second through-hole of the rear track fitting. A center of the first through-hole of the rear track fitting may be offset from a center of the second through-hole of the rear track fitting by approximately 0.5 inches (1.27 cm) or other suitable distances.

In some embodiments, reconfiguring the rear track fitting involves adjusting a cap (e.g., the cap 402 illustrated and described with respect to FIG. 4) of the rear track fitting. The cap 402 may be positioned with respect to the rear track fitting such that the cover portion 406 is positioned in the first through-hole of the rear track fitting and the passage portion 408 is positioned in the second through-hole of the rear track fitting. The cap 402 can be removed so that a cover portion 406 of the cap 402 is removed from the first through-hole and so that the passage portion 408 of the cap 402 is removed from the second through-hole. Additionally, the cap 402 can be reinstalled such that the cover portion 406 of the cap 402 is installed in the second through-hole of the rear track fitting and such that the passage portion 408 of the cap is installed in the first through-hole of the rear track fitting.

In some embodiments, the process 900 can additionally include changing a pitch between multiple seats of a passenger seating arrangement. For example, the pitch between the multiple seats of the passenger seating arrangement can be adjusted from a whole-inch increment to a half-inch increment by repeating one or more of the operations of the process 900. Repeating the operations can involve repeating the accessing operation described with respect to the block 902, the reconfiguring operation described with respect to the block 904, and the reconfiguring operation described with respect to the block 906. In some embodiments, repeating the operations to adjust the pitch from whole-inch increments to half-inch increments involves repeating the operations for every other passenger seat along the length of the seat track of the passenger seating arrangement.

At block 908, one or more passenger seats of a passenger seating arrangement can be translated to achieve a uniform pitch between the passenger seats of the passenger seating arrangement. In some embodiments, passenger seats that are reconfigured (e.g., via the operations described with respect to the blocks 902, 904, and 906) can be translated to achieve the uniform pitch. Additionally or alternatively, the reconfigured passenger seats and/or the non-reconfigured passengers seats may be translated to achieve the uniform pitch.

The passenger seating arrangement may include passenger seats 12*a*-*c*. In one example, the passenger seats 12*a*-*c* may include a pitch of 31 inches (78.74 cm), which indicates that each passenger seat 12 of the passenger seating arrangement is spaced apart from a closest passenger seat by 31 inches (78.74 cm). The second passenger seat 12*b*, which may be positioned between the first passenger seat 12*a* and the third passenger seat 12*c*, may be reconfigured such that an updated position of the second passenger seat 12*b* is 0.5 inches (1.27 cm) rearward with respect to an initial position of the second passenger seat 12*b*. Accordingly, the pitch between the first passenger seat 12*a* and the second passenger seat 12*b* may be 31.5 inches (80.01 cm), but the pitch between the second passenger seat 12*b* and the third passenger seat 12*c* may be 30.5 inches (77.47 cm). To achieve the uniform pitch among the passenger seating arrangement, the third passenger seat 12*c* can be translated rearward by approximately 1 inch (2.54 cm) without reconfiguring the third passenger seat 12*c* to achieve the uniform pitch of 31.5 inches (80.01 cm). The rearward translation of the third passenger seat 12*c* may correspond to the translation at block 908, for example.

In another example, the passenger seats 12*a*-*c* may include a pitch of 31 inches (78.74 cm). The second passenger seat 12*b*, which may be positioned between the first passenger seat 12*a* and the third passenger seat 12*c*, may be reconfigured such that an updated position of the second passenger seat 12*b* is 0.5 inches (1.27 cm) forward with respect to an initial position of the second passenger seat 12*b*. Accordingly, the pitch between the first passenger seat 12*a* and the second passenger seat 12*b* may be 30.5 inches (77.47 cm), but the pitch between the second passenger seat 12*b* and the third passenger seat 12*c* may be 31.5 inches (80.01 cm). To achieve the uniform pitch among the passenger seating arrangement, the third passenger seat 12*c* can be translated forward by approximately 1 inch (2.54 cm) without reconfiguring the third passenger seat 12*c* to achieve the uniform pitch of 30.5 inches (77.47 cm). The rearward translation of the third passenger seat 12*c* may correspond to the translation at block 908, for example.

In the following, further examples are described to facilitate the understanding of the invention:

Example 1. A track fitting assembly for attaching a leg of a passenger seat to a seat track, the track fitting assembly comprising: a body comprising: an underside configured to be connected with a stud in a position in which the stud is extending from the body and in which the stud is receivable in the seat track; a first lateral side extending upward from the underside; a second lateral side positioned opposite the first lateral side and extending upward from the underside; a first through-hole extending through the first lateral side and the second lateral side; and a second through-hole extending through the first lateral side and the second lateral side, the second through-hole and the first through-hole positioned relative to one another so as to define alternate attachment interfaces for attachment to the leg of the passenger seat.

Example 2. The track fitting assembly of any of the preceding or subsequent examples, further comprising a tensioner pin extendible from the underside of the body to push down against the seat track such that an upward-facing surface of the stud is raised into engagement with a downward-facing surface of an overhanging lip of the seat track.

Example 3. The track fitting assembly of any of the preceding or subsequent examples, further comprising a cap, the cap comprising: a base having a cover portion and a passage portion, the base sized to be received in alignment with the first through-hole and the second through-hole so that one of the first through-hole or the second through-hole is accessible through the passage portion while the other of the first through-hole or the second through-hole is obstructed by the cover portion.

Example 4. The track fitting assembly of any of the preceding or subsequent examples, wherein at least one of: the cover portion comprises a closed-ended projection extending from the base and shaped as a plug; or the passage portion comprises an open-ended projection extending from the base and shaped as a bushing.

Example 5. The track fitting assembly of any of the preceding or subsequent examples, wherein the cap further comprises an indicator, the indicator comprising an indentation, a portion colored differently than at least part of the passage portion, or an indicia to indicate which of the first through-hole or the second through-hole is obstructed by the cover portion.

Example 6. The track fitting assembly of any of the preceding or subsequent examples, wherein the first through-hole and the second through-hole each include a profile shaped to correspond to a matching taper, wherein at least part of the cover portion and at least part of the passage portion each are shaped to correspond to the matching taper.

Example 7. The track fitting assembly of any of the preceding or subsequent examples, wherein the track fitting assembly comprises a rear track fitting and is configured to include at least two studs; or wherein the track fitting assembly comprises a front track fitting and is configured to include at least one stud.

Example 8. A passenger seat assembly configured for attachment to a seat track, the passenger seat assembly comprising: a passenger seat supported by a front leg and a rear leg; a front track fitting couplable to secure the front leg with the seat track; and a rear track fitting couplable to secure the rear leg with the seat track, the rear track fitting comprising a first through-hole and a second through-hole, the first through-hole defining a first attachment interface for attachment with the rear leg, the second through-hole defining a second attachment interface for attachment with the rear leg in an alternative mode of operation.

Example 9. The passenger seat assembly of any of the preceding or subsequent examples, wherein the front track fitting comprises: a stud; and a tensioner pin extendible to push down against the seat track such that an upward-facing surface of the stud is raised into engagement with a downward-facing surface of an overhanging lip of the seat track.

Example 10. The passenger seat assembly of any of the preceding or subsequent examples, wherein the stud and the clamping pin are threaded oppositely to one another.

Example 11. The passenger seat assembly of any of the preceding or subsequent examples, wherein the front track fitting comprises a cylindrical insert having a first threaded notch and a second threaded notch positioned on opposite sides of a diameter of the cylindrical insert, wherein the first threaded notch and the second threaded notch are threaded such that one is arranged to receive a right-handed thread from beneath and the other is arranged to receive a left-handed thread from beneath.

Example 12. The passenger seat assembly of any of the preceding or subsequent examples, wherein the front track fitting is configured for two alternate modes of operation, including: a first mode of operation in which the cylindrical insert is arranged with the first threaded notch receiving the tensioner pin in a fore portion of the front track fitting and in which the second threaded notch is receiving the stud in an aft portion of the front track fitting; and a second mode of operation in which the cylindrical insert is rotated from the first mode of operation by 180 degrees about a vertical axis perpendicular to a longitudinal axis the cylindrical insert, wherein in the second mode of operation, the cylindrical insert is arranged with the first threaded notch receiving the stud in the fore portion of the front track fitting and in which the second threaded notch is receiving the tensioner pin in the aft portion of the front track fitting.

Example 13. The passenger seat assembly of any of the preceding or subsequent examples, wherein the cylindrical insert at or adjacent an end face includes a mode indicator to indicate whether the cylindrical is arranged in the first mode or the second mode.

Example 14. The passenger seat assembly of any of the preceding or subsequent examples, wherein the front track fitting comprises a pair of through-holes respectively defining different attachment interfaces for attachment with the front leg.

Example 15. The passenger seat assembly of any of the preceding or subsequent examples, further comprising the seat track.

Example 16. A method of reconfiguring a passenger seating arrangement, the method comprising: accessing a passenger seat secured to a seat track by a front fitting and a rear fitting such that a reference point of the passenger seat is arranged at an initial position along a length of the seat track; reconfiguring the front fitting to facilitate securement in which the reference point of the passenger seat is in an offset position that differs from the initial position by approximately 0.5 inches along the length of the seat track; and reconfiguring the rear fitting to facilitate securement in which the reference point of the passenger seat is in the offset position, wherein reconfiguring the rear fitting includes disengaging a rear leg of the passenger seat from a first through-hole in the rear fitting and engaging the rear leg with a second through-hole in the rear fitting.

Example 17. The method of any of the preceding of subsequent examples, further comprising changing a pitch between seats of the passenger seating arrangement from a whole inch increment to a half inch increment by repeating the accessing, the reconfiguring the front fitting, and the reconfiguring the rear fitting for every other seat along the length of the seat track.

Example 18. The method of any of the preceding of subsequent examples, wherein reconfiguring the front fitting comprises: removing a cylindrical insert having oppositely threaded notches on opposite sides of a diameter of the cylindrical insert; and installing the cylindrical insert in a reversed orientation to switch which of the oppositely threaded notches is facing forward and which is facing aft.

Example 19. The method of any of the preceding of subsequent examples, wherein reconfiguring the front fitting further comprises: rotating a stud in a rotational direction to engage one of the threaded notches for raising a portion of the stud into engagement with a downward-facing surface of an overhanging lip of the seat track; and rotating a tensioner pin in the same rotational direction as the stud to engage the tensioner pin with the other of the threaded notches for pushing a portion of the tensioner pin down against the seat track.

Example 20. The method of any of the preceding of subsequent examples, wherein reconfiguring the rear fitting comprises: removing a cap so that a cover portion of the cap is removed from the first through-hole and so that a passage portion of the cap is removed from the second through-hole; and reinstalling the cap so that the cover portion of the cap is installed at the second through-hole and so that the passage portion of the cap is installed at the first through-hole.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A track fitting assembly for attaching a leg of a passenger seat to a seat track, the track fitting assembly comprising:
    a body comprising:
        an underside configured to be connected with a stud in a position in which the stud is extending from the body and in which the stud is receivable in the seat track;
        a first lateral side extending upward from the underside;
        a second lateral side positioned opposite the first lateral side and extending upward from the underside;
        a first through-hole extending through the first lateral side and the second lateral side;
        a second through-hole extending through the first lateral side and the second lateral side, the second through-hole and the first through-hole positioned relative to one another so as to define alternate attachment interfaces for attachment to the leg of the passenger seat; and
    a cap comprising a base having a cover portion and a passage portion arranged so that one of the first through-hole or the second through-hole is accessible through the passage portion while the other of the first through-hole or the second through-hole is obstructed by the cover portion.

2. The track fitting assembly of claim 1, further comprising a tensioner pin extendible from the underside of the body to push down against the seat track such that an upward-facing surface of the stud is raised into engagement with a downward-facing surface of an overhanging lip of the seat track.

3. The track fitting assembly of claim 1, wherein at least one of:
    the cover portion comprises a closed-ended projection extending from the base and shaped as a plug; or
    the passage portion comprises an open-ended projection extending from the base and shaped as a bushing.

4. The track fitting assembly of claim 1, wherein the cap further comprises an indicator, the indicator comprising an indentation, a portion colored differently than at least part of the passage portion, or an indicia to indicate which of the first through-hole or the second through-hole is obstructed by the cover portion.

5. The track fitting assembly of claim 1, wherein the first through-hole and the second through-hole each include a profile shaped to correspond to a matching taper, wherein at least part of the cover portion and at least part of the passage portion each are shaped to correspond to the matching taper.

6. The track fitting assembly of claim 1, wherein the track fitting assembly comprises a rear track fitting and is configured to include at least two studs; or
    wherein the track fitting assembly comprises a front track fitting and is configured to include at least one stud.

7. A passenger seat assembly configured for attachment to a seat track, the passenger seat assembly comprising:
    a passenger seat supported by a front leg and a rear leg;
    a front track fitting couplable to secure the front leg with the seat track; and
    a rear track fitting couplable to secure the rear leg with the seat track, the rear track fitting comprising the track fitting assembly of claim 1.

8. The passenger seat assembly of claim 7, wherein the front track fitting comprises:
    a stud; and
    a tensioner pin extendible to push down against the seat track such that an upward-facing surface of the stud is raised into engagement with a downward-facing surface of an overhanging lip of the seat track.

9. The passenger seat assembly of claim 8, wherein the stud and the tensioner pin are threaded oppositely to one another.

10. The passenger seat assembly of claim 9, wherein the front track fitting comprises a cylindrical insert having a first threaded notch and a second threaded notch positioned on opposite sides of a diameter of the cylindrical insert, wherein the first threaded notch and the second threaded notch are threaded such that one is arranged to receive a right-handed thread from beneath and the other is arranged to receive a left-handed thread from beneath.

11. The passenger seat assembly of claim 10, wherein the front track fitting is configured for two alternate modes of operation, including:
   a first mode of operation in which the cylindrical insert is arranged with the first threaded notch receiving the tensioner pin in a fore portion of the front track fitting and in which the second threaded notch is receiving the stud in an aft portion of the front track fitting; and
   a second mode of operation in which the cylindrical insert is rotated from the first mode of operation by 180 degrees about a vertical axis perpendicular to a longitudinal axis the cylindrical insert, wherein in the second mode of operation, the cylindrical insert is arranged with the first threaded notch receiving the stud in the fore portion of the front track fitting and in which the second threaded notch is receiving the tensioner pin in the aft portion of the front track fitting.

12. The passenger seat assembly of claim 11, wherein the cylindrical insert at or adjacent an end face includes a mode indicator to indicate whether the cylindrical is arranged in the first mode of operation or the second mode of operation.

13. The passenger seat assembly of claim 7, wherein the front track fitting comprises a pair of through-holes respectively defining different attachment interfaces for attachment with the front leg.

14. The passenger seat assembly of claim 7, further comprising the seat track.

15. A method of reconfiguring a passenger seating arrangement, the method comprising:
   accessing a passenger seat secured to a seat track by a front fitting and a rear fitting such that a reference point of the passenger seat is arranged at an initial position along a length of the seat track;
   reconfiguring the front fitting to facilitate securement in which the reference point of the passenger seat is in an offset position that differs from the initial position by approximately 0.5 inches along the length of the seat track; and
   reconfiguring the rear fitting to facilitate securement in which the reference point of the passenger seat is in the offset position, wherein reconfiguring the rear fitting includes disengaging a rear leg of the passenger seat from a first through-hole in the rear fitting and engaging the rear leg with a second through-hole in the rear fitting.

16. The method of claim 15, further comprising changing a pitch between seats of the passenger seating arrangement from a whole inch increment to a half inch increment by repeating the accessing, the reconfiguring the front fitting, and the reconfiguring the rear fitting for every other seat along the length of the seat track.

17. The method of claim 15, wherein reconfiguring the front fitting comprises:
   removing a cylindrical insert having oppositely threaded notches on opposite sides of a diameter of the cylindrical insert; and
   installing the cylindrical insert in a reversed orientation to switch which of the oppositely threaded notches is facing forward and which is facing aft.

18. The method of claim 17, wherein reconfiguring the front fitting further comprises:
   rotating a stud in a rotational direction to engage one of the threaded notches for raising a portion of the stud into engagement with a downward-facing surface of an overhanging lip of the seat track; and
   rotating a tensioner pin in the same rotational direction as the stud to engage the tensioner pin with the other of the threaded notches for pushing a portion of the tensioner pin down against the seat track.

19. The method of claim 15, wherein reconfiguring the rear fitting comprises:
   removing a cap so that a cover portion of the cap is removed from the first through-hole and so that a passage portion of the cap is removed from the second through-hole; and
   reinstalling the cap so that the cover portion of the cap is installed at the second through-hole and so that the passage portion of the cap is installed at the first through-hole.

* * * * *